United States Patent [19]

Delarche et al.

[11] Patent Number: 4,546,175
[45] Date of Patent: Oct. 8, 1985

[54] PROCESS FOR THE MANUFACTURE OF REELS OF NITROCELLULOSE THREAD

[75] Inventors: Hubert Delarche, Sigoules; Alain Brasquies; Michel Maures, both of Bergerac, all of France

[73] Assignee: Societe Nationale des Poudres et Explosifs, Paris, France

[21] Appl. No.: 656,668

[22] Filed: Oct. 1, 1984

[30] Foreign Application Priority Data

Jun. 5, 1984 [FR] France ................. 84 08752

[51] Int. Cl.$^4$ .......................... C08B 5/02; D06B 5/16
[52] U.S. Cl. ......................................... 536/35; 8/154; 8/155; 8/155.1; 8/530; 536/42
[58] Field of Search ............... 8/530, 155.1, 154, 155; 536/35, 42

[56] References Cited

U.S. PATENT DOCUMENTS

| | | | |
|---|---|---|---|
| 1,859,037 | 5/1932 | Huttinger | 8/155 |
| 2,384,415 | 9/1945 | Berl | 536/42 |
| 3,145,398 | 8/1964 | Wyatt | 8/155.1 |
| 3,413,080 | 11/1968 | Schlagenhof et al. | 8/155.1 |
| 3,534,018 | 10/1970 | Brissaud et al. | 536/42 |
| 3,926,552 | 12/1975 | Bruckner | 8/155.1 |
| 4,135,268 | 1/1979 | von der Eltz et al. | 8/155.1 |
| 4,410,694 | 10/1983 | Nakayama et al. | 8/155.1 |

FOREIGN PATENT DOCUMENTS

| | | |
|---|---|---|
| 1200063 | 12/1959 | France . |
| 1567118 | 3/1969 | France . |
| 2259775 | 8/1975 | France . |
| 2296586 | 7/1976 | France . |
| 2306924 | 11/1976 | France . |

Primary Examiner—Ronald W. Griffin
Attorney, Agent, or Firm—Bucknam and Archer

[57] ABSTRACT

According to the invention the reels 10 of cellulose thread wound in a loose manner around a hollow perforated core are arranged on the nozzles 9 carried by the hollow arms 8 of a rotor 7a placed on a hollow frame 7 situated at the bottom of a tank 6. A pump 13 causes the nitrating medium 15 consisting of a mixture of nitric acid and methylene chloride to circulate into the pipe 14 from where it passes into the frame 7 and then to the rotor 7a from where it is brought under pressure via the pipes 8 and the nozzles 9 to the hollow perforated core of each reel. The nitrating medium then passes radially along the mass of thread making up each reel and returns to the pump 13 via the pipes 12. After nitration the nitrocellulose threads are immediately stabilized by washing them with water in a similar installation to that used for nitration.

The process according to the invention makes it possible to manufacture reels of nitrocellulose thread of good quality in a simple manner in large quantities without the manufacturer having to perform delicate unwinding and reeling operations on the thread before and after nitration.

18 Claims, 7 Drawing Figures

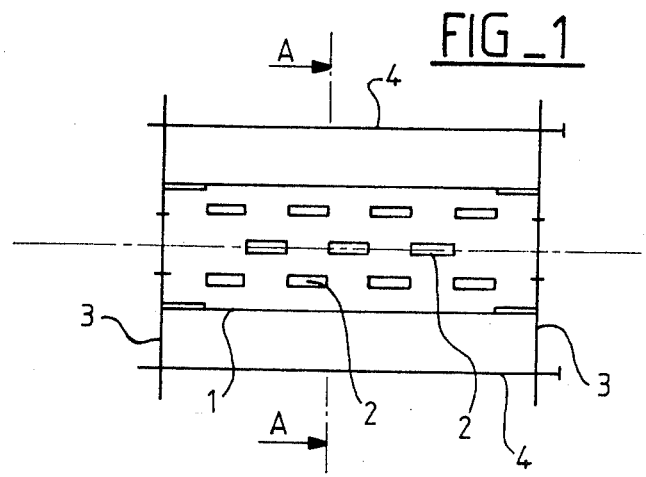
FIG_1
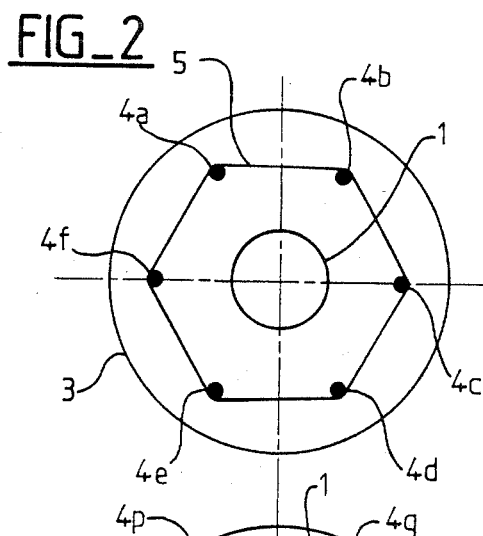
FIG_2
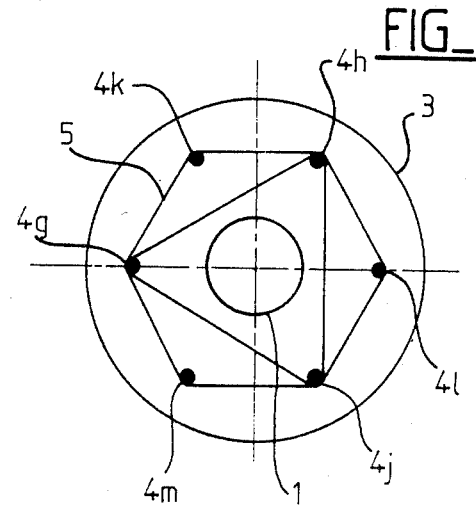
FIG_3
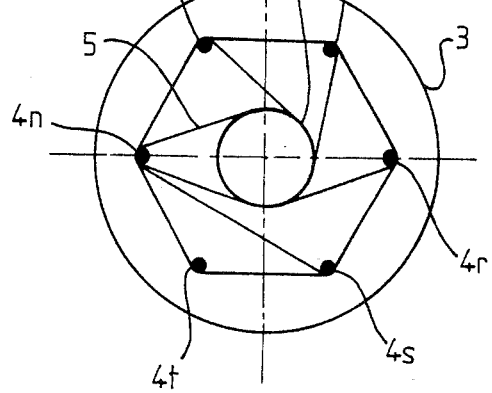
FIG_4
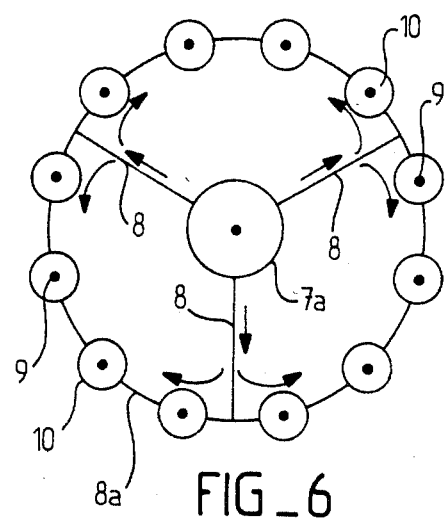
FIG_6

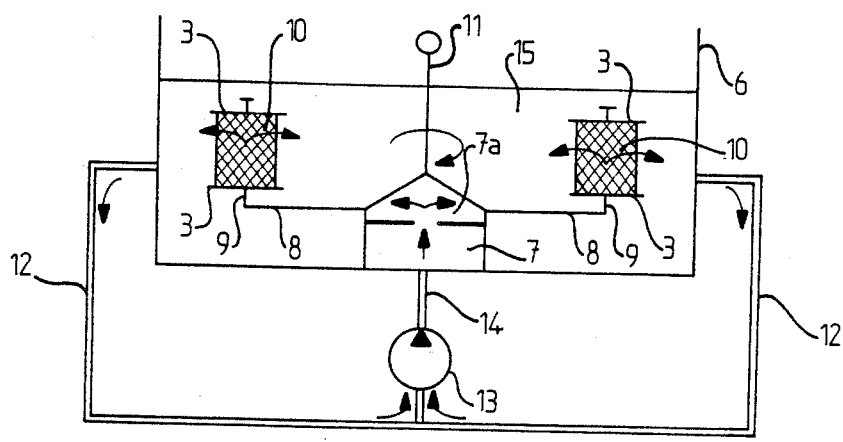
FIG_5
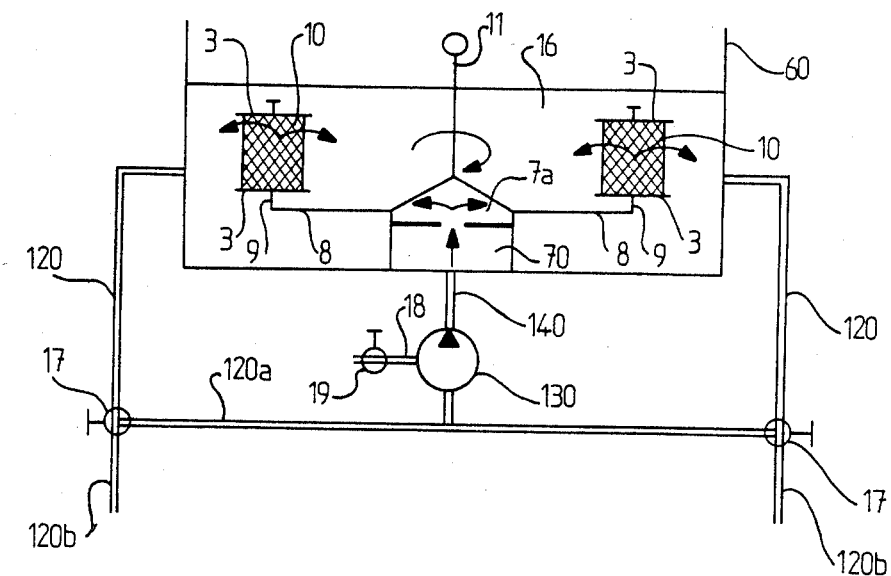
FIG_7

4,546,175

PROCESS FOR THE MANUFACTURE OF REELS OF NITROCELLULOSE THREAD

This invention concerns the manufacture of nitrocellulose thread and more specifically the manufacture of reels of nitrocellulose thread.

In many applications in explosives technology it is necessary to have nitrocellulose in the form of a thread. For example, the case can be quoted of certain transmission cords for detonating explosives used in quarries or mines which consist of nitrocellulose threads surrounded by a plastic or metal sheath.

Nitrocellulose thread is traditionally obtained by nitrating cellulose thread. The actual nitration of the cellulose threads is generally carried out using concentrated nitric acid by itself or in a mixture with a halogenated hydrocarbon such as methylene chloride. The French Pat. Nos. 1 200 063 and 1 567 118 describe traditional processes for nitrating cellulose thread. According to these processes the cellulose thread is unwound from a reel and continuously passes through a chamber containing the nitrating agent and after finishing treatment is conditioned for the subsequent application for which it is intended. As for many applications it is useful to have reels of nitrocellulose thread, after finishing the thread is usually wound on to a reel which is quite a delicate operation bearing in mind the special mechanical properties of nitrocellulose threads. Therefore, in general traditional techniques for manufacturing nitrocellulose thread force the production engineer to unwind the cellulose thread from a reel before nitration and then wind the nitrocellulose thread on another reel, these operations increase the risks of breaking the thread.

Processes for treating cellulose thread with liquids are known, the thread remaining wound around a reel throughout the treatment without having to unwind and rewind around a reel during treatment. This is in particular the case with dyeing operations in which a reel of crude, non-coloured thread coming directly from the thread production unit is immersed in a dyeing bath to produce a reel of coloured thread. The French Pat. No. 2 259 775 describes reels of thread wound round a permeable hollow core, so that these reels provide radial permeability allowing them to be dyed uniformly. In order to obtain reels of thread which are properly permeable for dyeing moving rods are often used when winding the thread around the core of the reel so that the thread is wound loosely. These rods are then pulled out or pushed towards the central core at the time of the actual dyeing operation so that the mass of thread has a good permeability to the dyeing solution. Thus, the French Pat. No. 2 296 586 describes reels of thread wound around a central hollow core using moving rods at the time of winding the thread to give a certain permeability to the mass of the thread. The French Pat. No. 2 306 924 in its turn describes the production of balls of thread intended for dyeing by winding the thread around provisional rods which are then withdrawn.

However, these techniques seem restricted to dyeing operations on threads and at the present time, at least to the knowledge of the applicant, there is no known process for the nitration of thread on reels, no doubt because of the prejudice associated with the gelatinization of the cellulose at the time of its conversion to nitrocellulose which makes the experienced engineer fear that the mass of the thread to be nitrated will set as a whole at the time of nitration and become unuseable.

The specific object of this invention is to propose a process for manufacturing reels of nitrocellulose thread by nitrating cellulose thread reels, this process not forcing the production engineer to unwind and rewind the thread before and after nitration without any risk of the thread caking during nitration. In fact, the applicant has discovered that, provided certain operating conditions are satisfied, it is possible to manufacture reels of nitrocellulose thread by direct nitration of a cellulose thread wound around a reel without having to unwind the thread and then to rewind it, and without risking any setting of the thread during nitration.

The object of the invention therefore consists of a process for manufacturing reels of nitrocellulose thread by nitration using a nitric acid-methylene chloride mixture on a cellulose thread wound around a reel principally consisting of a hollow core provided with holes, two plates at each end of the said core and sliding rods supported by the said plates, around which is wound the said thread, wherein:

(1) after winding the cellulose thread the said sliding rods are moved away or towards the said core, (2) the cellulose thread is nitrated by radial circulation of the nitric acid-methylene chloride mixture through the said reel from the said hollow core, (3) the thread is stabilized immediately after nitration by circulating water radially through the said reel from the said hollow core with the temperature of the water lying between 50° C. and 90° C. at least at the end of stabilization.

The process according to the invention will now be described in detail by referring to FIGS. 1-7.

FIG. 1 represents a reel required for implementing the invention before winding the thread, FIGS. 2, 3 and 4 represent AA section views of three different possibilities of winding the thread around the sliding rods, FIG. 5 represents in diagrammatic fashion an installation allowing the nitration process to be implemented in accordance with the invention, FIG. 6 represents, in a view from above, a possibility of implementing the process with the installation represented in FIG. 5 according to which a large number of reels of nitrocellulose thread is produced in the same operation, FIG. 7 represents in diagrammatic fashion an installation particularly well adapted for carrying out stabilization operations.

The process according to the invention therefore consists of carrying out the nitration and stabilization of a cellulose thread wound around a reel. This reel shown in FIG. 1 mainly consists of a hollow core 1 with holes 2 arranged over the entire surface of the said core 1. The said core 1 is in general a body of revolution and preferentially a cylinder as shown in FIG. 1 or a truncated cone. The choice of a truncated cone reel makes it possible to obtain reels which are easy to unwind after nitration. Each end of the said core 1 has a plate 3, generally circular and provided with a central hole facing the hollow section of the core 1. The plates 3 are provided with means, such as holes, slots or grooves, accomodating sliding rods 4 resting on the said plates 3. The said sliding rods 4 must be easily removed by dismantling or pushed towards the core 1 by sliding in the grooves in the said plates. The core 1, the plates 3 and the sliding rods 4 must be made of material resistant to nitric acid and to methylene chloride and not present any risk of easily accumulating electrostatic charges. This is advantageously accomplished by using materials such as polypropylene or polytetrafluoroethylene.

One of the essential characteristics of the invention is that the mass of the cellulose thread must be loosely wound around the core 1 so as to allow easy passage of the nitrating medium and afterwards the stabilization water through the mass of thread. In order to obtain this result the thread is wound with a certain winding angle to ensure the cohesion of the mass of thread around the sliding rods 4. The "winding angle" is understood as the angle defined by the thread and a perpendicular to the axis of the core 1. This angle preferably lies between 16 and 17°. After winding the thread by pulling out the sliding rods 4 or by pushing the latter close to the core 1 it is ensured that the mass of thread has a certain permeability necessary for the easy passage of the nitrating medium and the stabilization water.

FIGS. 2, 3 and 4 show, as seen in an AA section, three different possibilities of winding the thread around the sliding rods on a reel as shown in FIG. 1.

FIG. 2 shows the core 1, a plate 3 and six sliding rods 4a, 4b, 4c, 4d, 4e and 4f which are all assembled before winding. The thread 5 is wound around these six sliding rods.

FIG. 3 shows the core 1, a plate 3 and three sliding rods 4g, 4h, 4j, assembled before winding. The thread 5 is first wound around these three sliding rods and during the winding three additional rods 4k, 4l, 4m are added to finish winding the thread 5 around the six rods 4g, 4k, 4h, 4l, 4j, 4m.

FIG. 4 shows the core 1, the plate 3 and a sliding rod 4n. The thread 5 is first wound around the rod 4n and the core 1. After a certain number of turns a second sliding rod 4p is added and the thread 5 is wound around the two rods 4n and 4p and the core 1.

After a certain number of turns, a third sliding rod 4q is added, the thread 5 being wound around the three rods 4n, 4p, 4q and the core 1, then, after a certain number of turns a fourth sliding rod 4r is added, the thread 5 being wound around the four rods 4n, 4p, 4q, 4r and the core 1. After a certain number of turns, a fifth rod 4s is added, the thread 5 being now wound around the five rods 4n, 4p, 4q, 4r, 4s then after a certain number of turns a sixth rod 4t is added, the thread 5 being wound around the six rods 4n, 4p, 4q, 4r, 4s, 4t. The aeration homogeneity increases from the winding corresponding to FIG. 2 to the winding corresponding to FIG. 4.

Any cellulose thread suitable for nitration may be used as the cellulose thread, five cotton threads being particularly suitable for implementing the invention.

The reel of thread being produced in this way the sliding rods 4 are pulled out or pushed towards the hollow core 1 depending on what possibilities are provided by the type of winding adopted and how the said sliding rods are attached to the plates 3 in order to give the mass of the thread the necessary permeability for carrying out the nitration and stabilization phases. In fact, in contrast to the dyeing of cellulose threads when nitrating cellulose threads it is necessary to take into account the existence of two interconnected phenomena which produce good aeration of the thread and which, when the latter is properly calculated, are responsible for obtaining a nitrated wire reel with correct winding; these two phenomena are as follows:

on the one hand a swelling of the thread during nitration (increase in diameter), on the other hand a shrinking of the thread during nitration (reduction in length).

Any obstacle hindering these two trends leads to a gelatinization of the entire mass and to the thread breaking during nitration.

Finally for a good implementation of the process according to the invention it is indispensable that the reels of thread are dried before nitration. This drying may advantageously be carried out in an oven.

Once the reel of thread is prepared in this way, it is immersed in a nitrating bath. An essential characteristic of the invention is that it is essential not to just immerse the reel of thread in the nitrating bath even if it is stirred, but to ensure that as soon as the reel is immersed in the nitrating bath the nitrating medium circulates radially from the hollow core of the reel through the mass of thread wound around the said core. In order to do this it is necessary to provide for the nitrating medium to arrive inside the hollow core 1 under pressure so that the nitrating medium is made to pass through the holes 2 arranged over the surface of the core 1 and to pass radially over the mass of thread wound round the said core.

A mixture of pure nitric acid and methylene chloride is used as the nitrating bath for implementing the invention. The quantity of nitric acid contained in the mixture is advantageously taken between 20% and 30% weight relative to the total weight of the mixture, the percentage of nitric acid in the nitrating bath serving to control the nitrogen content of the nitrocellulose thread. Proportions of nitric acid close to 20% produce weakly nitrated threads with nitrogen content less than 12%, proportions of nitric acid close to 30% produce strongly nitrated threads with nitrogen content larger than 13%. The nitration ratio, i.e. the weight ratio between the weight of the nitrating bath used and the weight of the thread to be nitrated must be at least equal to 200 and preferably be close to 300. The temperature of the nitrating bath during nitration is preferably taken between 20° and 25° C.

FIG. 5 shows an installation which is the most advantageous known to the applicant for implementation.

The installation shown in FIG. 5 consists of a tank 6 at the bottom of which is a central hollow frame 7, a hollow, impervious rotor 7a rotating freely which communicates with the frame 7 and which is equipped with hollow arms 8. Each hollow arm 8 terminates at a nozzle 9 on which a reel is placed, the nozzle 9 penetrating inside the hollow core 1 of the said reel thanks to the hole made in each plate 3 serving to close the reel. The rotor 7a on the central frame 7 may be made to rotate thanks to a hook 11 connected to a drive mechanism not shown. Pipes 12 put the tank 6 in communication with a pump 13 which in its turn communicates with the inside space of the central frame 7 via a pipe 14. The installation described above operates as follows. With the reels 10 of cellulose thread placed on the nozzles 9, the tank 6 is filled with the nitrating medium 15 so as to completely cover the said reels. The pump 13 is started, the nitrating medium being brought in this way under pressure to the inside of the central frame 7 via the pipes 12 and 14 from where it passes to the rotor 7a so that it enters the hollow cores of the reels 10 under pressure via the hollow arms 8 and the nozzles 9. The nitrating medium is thus made to pass through the holes 2 made in the surface of the core 1 and to pass radially over the mass of thread on the reel 10. If it is desired to work with a stirred nitrating medium it is sufficient to make the rotor 7a rotate. The rotation of the rotor 7a causes a rotation of the arms 8 and the reels 10 which causes the medium 15 to be stirred.

FIG. 6 represents, seen from above, a particular advantageous implementation of the installation shown in FIG. 5. According to this implementation the rotor 7a is equipped with three hollow arms 8 which carry a circular hollow rail 8a. This circular rail itself carries equally spaced nozzles 9 on which the reels are attached. The example shown in FIG. 6 shows an installation allowing 12 reels to be treated at the same time.

After nitration which usually lasts from 15 to 30 minutes depending on the amount of thread to be nitrated and the admission rate of the nitrating medium, the stabilization operation must be carried out immediately. This involves washing the nitrocellulose threads with water.

According to a final essential characteristic of the invention it is best to carry out this washing operation with water ensuring radial circulation of the water starting from the hollow core of the reel over the mass of nitrocellulose thread wound round the said reel. In order to do this, it is necessary to make the water arrive inside the hollow core 1 under pressure so that the water passes through the holes 2 arranged on the surface of the core 1 and passes radially over the mass of the nitrocellulose thread. It is also necessary that the water has a temperature of 50°-90° C. and preferably 60°-85° C. at least at the end of stabilization. At the beginning of stabilization it is possible either to use water at ambient temperature or water already at 50°-90° C. Furthermore, at the beginning of stabilization it is not advisable to use a closed circuit and to reuse the water already in use whereas at the end of stabilization it is possible to use a closed circuit and to reuse water already.

An installation particularly well suited to carrying out stabilization operations is shown in FIG. 7. This installation similar to that used for nitration shown in FIG. 5 consists essentially of a tank 60 at the bottom of which is placed a hollow frame 70 identical to the frame 7 used in the nitration installation.

According to a preferred implementation of the invention, the freely rotating rotor 7a from the nitration installation is placed on this frame 70. The rotor 7a can be easily transported with the reels 10 thanks to the hook 11 which is reattached, preferably to a drive mechanism for rotation not shown. Pipes 120 put the tank 60 into communication via 3-way valves 17, either with a pipe 120a connected to a pump 130 which in its turn communicates with the hollow frame 70 thanks to a pipe 140, or with the pipes 120b which discharge into a recovery tank not shown. The pump 130 may also be put into communication with an external water inlet 18 controlled by a cock 19.

At the beginning of stabilization the tank 60 is filled with water 16, the valves 17 are opened in order to connect the pipes 120 to the pipes 120b and to shut off the pipe 120a. The pump 130 is connected to the external water inlet 18 whose cock 19 is open. The water from the inlet 18 is delivered under pressure via the pipe 140 to the inside of the hollow frame 70 from where it passes to the rotor 7a which directs it via the pipes 8 and the nozzles 9 to the hollow core 1 of the reels 10. The water then passes through the slits 2 arranged on the surface of the core 1 and passes radially over the mass of nitrocellulose thread on the reel carrying away the residual nitric acid and methylene chloride. The water containing nitric acid and methylene chloride is discharged via pipes 120 and 120b to the recovery tank from where the methylene chloride and nitric acid can be recovered by distillation. As already mentioned the water for this first stabilization phase may be at ambient temperature or already at a temperature of 50°-90° C. This first stabilization phase lasts approximately 1 hour.

At the end of this first phase, the tank 60 is emptied, the valves 17 are operated so as to put the pipes 120 in communication with the pipe 120a and to shut off the pipes 120b. The pump 130 is connected to the pipe 120a with the external water inlet 18 disconnected and shut off by the cock 19. The tank 60 is then filled with water at a temperature of 50°-90° C., preferably 60°-85° C. and the pump 130 started up. The second stabilization phase is then carried out by circulating the water in closed circuit in complete similarity with the procedure adopted for circulating the nitrating medium during the nitration operation described above. This second stabilization phase also lasts approximately 1 hour. At the end of the stabilization operations, the reels 10 of nitrocellulose thread are spin dried. The drying operation may either be effected directly in the installation shown in FIG. 7 by setting the rotor 7a in rotation, the tank 60 first having been emptied of the water it contained or in an extra centrifugal drier in which the reels 10 of nitrocellulose thread are loosely arranged.

After drying the reels of nitrocellulose preserve a correct cross winding around their support and if required the nitrocellulose thread may be easily unwound without any noticeable local setting of the thread. Furthermore, reels obtained in accordance with the invention exhibit excellent preservation characteristics.

The process according to the invention enables reels of nitrocellulose thread of good quality to be manufactured simply and in large quantities without forcing the manufacturer to carry out delicate operations of unwinding and winding the thread before and after nitration.

EXAMPLE

A thread of pure worsted cotton with linear density of 25 mg/m was wound on twelve polypropylene reels consisting of two plates of 160 mm in diameter, a perforated core of 70 mm diameter and six sliding rods arranged before winding as shown in FIG. 2. The thread was wound around the six sliding rods in accordance with cross winding with diameter 135 mm and width 190 mm and a winding angle of 16°-17° so as to obtain a winding pitch of 125 mm. The thread wound round the reel in this way weighed 150 g.

After the thread has been wound the sliding rods were pulled out and the two reels were dried in an oven at 60° C. for 12 hours.

The reels were then nitrated in an installation similar to that shown in FIG. 5 under the following conditions: composition by weight of the nitrating medium:
nitric acid=24.5%
methylene chloride=75.5%

$$\text{Nitration Ratio} = \frac{\text{Weight of the medium}}{\text{Weight of dry thread to be nitrated}} = 280,$$

which corresponds to approximately 350 liters of nitrating medium for 12 reels.
Temperature of the nitrating medium: 22° C.
Duration of nitration: 20 minutes.

Rate of circulating the medium over each reel: 1 m³/h.

After nitration, the twelve reels of nitrocellulose thread were stabilized in an installation similar to that shown in FIG. 7 under the following conditions:
first stabilization phase in open circuit (recovery tank and external water inlet):
water temperature: approximately 20° C.
duration: 1 hour
rate of circulation of the water over each reel: 1 m³/h
second stabilization phase in closed circuit:
water temperature: 80° C.
duration: 1 hour
rate of circulation of the water over each reel: 1 m³/h At the end of the second stabilization phase, the two reels were spin dried for 20 seconds to bring the water content in the nitrocellulose thread to around 30%.

For each of the two reels, the appearance of the thread was very satisfactory, the winding was correct and unwinding was easy.

The nitrocellulose thread on each reel weighed 230 g (expressed in terms of dry matter), i.e. a linear density of 42 mg/m for the nitrated thread. The resistance to breaking of the nitrocellulose thread was 400 g.

The nitrocellulose thread exhibited the following nitration characteristics measured on the two reels:

|  |  | Nitrogen content | Stablility at 134.5° C. |
|---|---|---|---|
| Reel 1 | Outer layer | 12.89% | >30 s |
|  | Inner layer | 12.78% | >30 s |
| Reel 2 | Outer layer | 12.93% | >30 s |
|  | Inner layer | 13.12% | >30 s |

We claim:

1. A process of manufacturing a reel of nitrocellulose threads, which comprises the steps of:
   (1) Winding cellulose thread around a hollow core provided with orifices, two plates each located at each end of said core, said plates having a central opening facing the hollow core and a plurality of sliding rods supported by said plates whereby a reel of cellulose is obtained;
   (2) sliding said sliding rods to confer permeability to said reel of cellulose;
   (3) drying said reel of cellulose;
   (4) circulating a mixture of nitric acid and methylene chloride through said reel radially from said hollow core while said reel is immersed in said mixture of nitric acid and methylene chloride, whereby a reel of nitrocellulose thread is formed;
   (5) immediately after nitration, stabilizing said reel of nitrocellulose by radially circulating water from said hollow core, the water having a temperature of 50°–90° C. at least at the end of the stabilization.

2. Process according to claim 1 wherein the said thread is a cotton thread.

3. Process according to claim 1 wherein the amount of nitric acid used for the nitration lies between 20% and 30% by weight with respect to the total weight of the mixture of nitric acid methylene chloride.

4. Process according to claim 3 wherein the nitration ratio is at least equal to 200.

5. Process according to claim 4 wherein the nitration ratio is close to 300.

6. Process according to claim 3 wherein the temperature of the nitric acid methylene chloride mixture lies between 20° and 25° C.

7. Process according to claim 1 wherein the temperature of the water lies between 60° and 85° C. at least at the end of stabilization.

8. Process according to claim 1 wherein the mixture of nitric acid and methylene chloride is introduced to the said hollow core of each reel under pressure.

9. Process according to claim 1 wherein the water for stabilization is introduced under pressure to the said hollow core of each reel.

10. The process according to claim 1, wherein said cellulose thread is wound around the core in step (1) at a winding angle of 16°–17°.

11. The process according to claim 1 wherein stirring is provided during said step (4).

12. The process according to claim 1, wherein in said step (5) said reel of nitrocellulose is completely immersed in water.

13. The process according to claim 1 wherein said core has a cylindrical shape.

14. The process according to claim 1 wherein said core has the shape of a truncated cone.

15. The process according to claim 1 wherein said plates have grooves and said sliding rods are pushed in said grooves towards said core in step (2).

16. The process according to claim 1 wherein said sliding rods are pulled out from said plate in step (2).

17. The process according to claim 1 wherein said nitrocellulose in said reel is not gelatinized.

18. The process according to claim 1 wherein said cellulose thread in step (1) is wound loosely around said reel.

* * * * *